US008660305B2

(12) United States Patent
Herling et al.

(10) Patent No.: US 8,660,305 B2
(45) Date of Patent: Feb. 25, 2014

(54) METHOD AND APPARATUS FOR REMOVING A VISUAL OBJECT FROM A VISUAL DATA STREAM

(75) Inventors: Jan Herling, Ilmenau (DE); Wolfgang Broll, Erfurt (DE)

(73) Assignee: Technische Universitaet Ilmenau (DE)

( * ) Notice: Subject to any disclaimer, the term of this patent is extended or adjusted under 35 U.S.C. 154(b) by 308 days.

(21) Appl. No.: 13/270,417

(22) Filed: Oct. 11, 2011

(65) Prior Publication Data
US 2013/0089258 A1     Apr. 11, 2013

(51) Int. Cl.
*G06K 9/00* (2006.01)
(52) U.S. Cl.
USPC ............................ 382/103; 382/173; 382/254
(58) Field of Classification Search
USPC .................................. 382/103, 173; 345/626
See application file for complete search history.

(56) References Cited

U.S. PATENT DOCUMENTS

| 5,355,446 | A  | * | 10/1994 | Maayan ......................... 345/626 |
| 7,912,296 | B1 | * | 3/2011  | Zelinka et al. ................ 382/209 |
| 2003/0053600 | A1 | * | 3/2003 | Schmitz et al. ............... 378/210 |
| 2008/0152245 | A1 | * | 6/2008 | El-Maleh et al. ............. 382/254 |
| 2008/0279442 | A1 | * | 11/2008 | Den Boef et al. ............ 382/144 |

OTHER PUBLICATIONS

Jan Herling, et al., "Advanced Self-contained Object Removal for Realizing Real-time Diminished Reality in Unconstrained Environment", Ilmenau University of Technology, Department of Virtual Worlds/Digital Games, Oct. 2010.

* cited by examiner

*Primary Examiner* — Hadi Akhavannik
(74) *Attorney, Agent, or Firm* — Mark D. Wieczorek; Mayer & Williams PC

(57) ABSTRACT

Methods and apparatuses for removing a visual object from a visual data stream. A live visual data stream containing present and subsequent images is received. A visual object is selected by defining a contour. A binary mask based on said contour is determined. Starting at the coarsest layer, regions outside the mask for replacing a region within the mask are selected. The region within the mask is replaced by content of the selected regions. The selecting and the replacing are successively repeated at each of the finer layers of the resolution pyramid finishing at the finest layer. The repeated replacing is also based on the content replaced at the next coarser layer. The step of determining a binary mask, calculating a resolution pyramid, and repeated selecting and repeated replacing are repeated for the received subsequent image. The repeated replacing is also based on the content replaced in the preceding image.

21 Claims, 1 Drawing Sheet

METHOD AND APPARATUS FOR REMOVING A VISUAL OBJECT FROM A VISUAL DATA STREAM

TECHNICAL FIELD

The present invention relates to processing of visual data streams and more particularly to removing of visual objects within that visual data stream. The removal of visual objects is a key task for generating so called Diminished Reality. The present invention discloses a method and an apparatus for removing a visual object from a visual data stream.

BACKGROUND

There are several current approaches for removing visual objects based on the replacement of regions such as patches or fragments.

Wexler, Y.; Shechtman, E. and Irani, M.: "Space-Time Video Completion" in IEEE Trans. Pattern Anal. Mach. Intell. 29, 3 Mar. 2007, pages 463-476 presented a method for space-time completion of large space-time "holes" in video sequences of complex dynamic scenes. That method is based on an approach which applies a global optimization strategy. An objective function provides the means for measuring the coherence between two images. Rather small patches extending over space and time of an image sequence are used as a basis. That approach results in a highly sophisticated completion and synthesis of damaged image regions as well as missing frames.

Barnes, C.; Shechtman, E.; Finkelstein, A. and Goldman, D.: "PatchMatch: A Randomized Correspondence Algorithm for Structural Image Editing" in ACM SIGGRAPH 2009 Papers, H. Hoppe, Ed. SIGGRAPH '09, ACM, New York, pages 1-11 presented interactive image editing tools using a randomized algorithm Those tools allow image completion as well as retargeting and reshuffling of images. For this, a randomized nearest neighbor algorithm is applied. This significantly speeds up the overall image generation even allowing for interactive image manipulations for rather small images.

A computer-implemented method for completing images is presented in US 2009/0003702 A1. That method receives images having holes, identifies the holes, and searches an image database to locate images that fill the holes.

WO 2010/129705 A1 discloses a computer-implemented method for generating a modified image. An image is displayed in a computer system. That image includes contents that have a feature visible therein. The contents have a region thereof defined to be provided with additional content in generating a modified image. An input is received that includes a mark indicating a region. Additional content for the region is determined using a patch-based optimization algorithm. The modified image is stored having the additional content in the region. The region may include a hole in the image without the contents wherein the modified image is generated in a hole-filling process.

A method for measuring bi-directional similarity between two signals is shown in WO 2008/139465 A2. According to that method, at least some patches of the first signal are matched with some patches of the second signal. Further, at least some patches of the second signal are matched with some patches of the first signal. A bi-directional similarity measure is calculated as a function of the matched patches.

SUMMARY

Implementations of the present invention provide methods for removing a visual object from a visual data stream. A visual object is a visual representation of a natural or synthetic object that is shown in the visual data stream. The object may change or move over time. The object may be, e.g., a human, an item, or the like. The visual data stream contains visual information over time. Simply, that visual data stream may be a live video that comprises temporally sequenced images. The live visual data stream contains a present image and temporally subsequent images. Each of the images contains pixels in two dimensions, e.g., as rectangular images. According to certain implementations of the invention, that visual data stream of a present image and temporally subsequent images is received in order to process the visual data stream. Initially, the present image is received that will be processed. Afterwards, the subsequent images will be received. In a further step of the method, the visual object to be removed is selected in the present image. The selection is preferably done by a user and results in a contour that is defined by said selection. That contour may be rough as it often encloses more pixels than the pure visual object. In a further step, a binary mask is determined on the basis of the contour. That binary mask provides binary information regarding every pixel of the present image, whether that pixel is within the region of the visual object to be removed or not.

In a further step, a resolution pyramid of the present image is calculated. That resolution pyramid includes several layers from a coarsest layer to a finest layer. All of the layers may represent the same received image. The coarsest layer includes the received image at the lowest resolution. The finest layer includes the received image at the highest resolution. The finest layer may show the same resolution as the received image. Every next layer contains that image in a lower resolution. Every layer of the resolution includes the binary mask, too.

The following steps of selecting and replacing regions are performed at the coarsest layer of the calculated resolution pyramid first of all. Regions of the image outside the binary mask are selected in order to replace at least one region within the mask or at least a subset of it. For this, preferably, a criterion based on the sum of squared differences (SSD) between the pixels of the region to be replaced and the pixels of the region to be selected is used. Alternatively or additionally, that criterion is preferably based on a measure of distance between the region to be replaced and the region to be selected. Preferably, that criterion is based on the SSD as well as the measure of distance. That region within the mask is at least partially replaced by content of the selected regions. The content is weighted by a measure of matching quality between the region to be replaced and the selected region. Within the binary mask, there may be one or several regions that will be replaced. Remaining regions or remaining subsets of regions may be filled by expanding the replaced content. Finally, the area of the binary mask on that coarsest layer is filled completely.

The regions to be replaced and the regions to be selected are patches of the received image at the respective layer of the resolution pyramid. The patches include pixels of the received image at the respective layer, preferably, in the same two dimensions as the image.

After the steps of selecting and replacing of one or more regions within the binary mask are performed at the coarsest layer of the resolution pyramid, those steps of selecting and replacing are repeated at the next finer layer of the calculated resolution pyramid. The repeating proceeds successively at each of the finer layers of the resolution pyramid until the finest layer is reached. Hence, that repeating can be regarded as a series of iterations. The repeated replacing is also based on the content replaced at the next coarser layer. From there, the replaced content results from the content in the selected regions as well as the content of the replaced region at the next coarser layer. Hence, that repeated replacing can be regarded as a series of update iterations. After that repeated replacing, the binary mask of the present image is filled completely so that the selected visual object is removed in that present image.

In a further step, a first subsequent image of the live visual data stream is received. The step of determining a binary mask and the step of calculating a resolution pyramid are repeated for the first subsequent image. Those steps are performed as explained above regarding the initially present image, wherein these steps may be refined or supplemented. Further, the step of repeated selecting of regions outside the mask and the step of repeated replacing of the region within the mask are performed for the received first subsequent image. However, that repeated replacing is also based on the content replaced in the corresponding region of the preceding initially present image. As explained in regard to the initially present image, the steps of selecting and replacing are performed starting at the coarsest layer of the resolution pyramid and proceed successively at each of the finer layers of the resolution pyramid until the finest layer is reached. After that repeated replacing, the binary mask of the first subsequent image is filled completely so that the selected visual object is removed in that subsequent image, too.

Those steps as explained in regard to the first subsequent image are repeated for every further subsequent image until the live visual data stream has ended.

One exemplary advantage of an implementation of the inventive method is that it can be performed computer-implemented in real-time. Potentially, the user can initially select a visual object in a live video, wherein that object is removed from the subsequently streamed live video in real-time.

Preferably, the step of determining a binary mask in one of the subsequent images is performed using the data of the binary mask of the preceding image. From there, the determining of the binary mask of the subsequent image is also based on the binary mask of the preceding image. The usage of that information from the preceding image saves effort for that determining, e.g., as computing time.

In preferred embodiments of the inventive method, the regions to be selected are quadratic regions, namely, quadratic patches. Such regions can be handled more easily.

Preferably, the regions to be selected become wider and wider from layer to layer of the resolution pyramid. The regions to be selected are smallest at the coarsest layer. The regions to be selected are largest at the finest layer. Consequently, large regions form a basis at the finest layer for replacing the region within the mask. That ensures a high coherence of the replaced region within the mask. Preferably, the regions becoming wider from layer to layer of the resolution pyramid are quadratic. The above-described extent of the regions is related to the number of pixels. From there, the regions to be selected show more pixels from layer to layer of the resolution pyramid. Since the resolution of the layers of the resolution pyramid becomes higher from layer to layer the extent of the regions in regard to the extent of the image may not become higher. Especially, the extent of the regions in regard to the extent of the image may become smaller from layer to layer even as the number of pixels becomes higher.

The binary mask may exactly outline the contour of the visual object. However, the binary mask is preferably rough, i. e.; the binary mask is larger than the visual object and overlaps the contour of the visual object. Therefore, the binary mask is advantageously enlarged by a predefined pixel border.

In preferred implementations, the image content within the binary mask of the subsequent images is replaced as explained in the following. The value of each pixel within the mask is calculated by values of the pixels within the selected regions and the value of the corresponding pixel within the binary mask of the next coarser layer and the value of the corresponding pixel within the binary mask of the preceding image. For this, the values of the pixels within the selected regions and the value of the corresponding pixel within the binary mask of the next coarser layer and the value of the corresponding pixel within the binary mask of the preceding image are weighted and summed up. The values of the pixels within the selected regions are at least weighted by the measure of matching quality between the region to be replaced and the selected region.

In preferred implementations, on all other than the finest layer of the resolution pyramid, the steps of selecting and replacing are performed on the basis of reduced image data, especially, on the basis of the gray value of each pixel in the region to be replaced and in the region to be selected. The complete color values of the pixels in the regions are only used on the finest layer of the resolution pyramid. These color values are preferably three-dimensional, e.g., RGB or YUV. The usage of gray values saves effort for selecting and replacing, e.g., as computing time.

Preferably, the step of repeated selecting of regions for replacing a region within the mask of one of the subsequent images is also based on the regions selected in the preceding image. Especially, the search for regions to be selected starts at the locations of the regions selected in the preceding image.

In preferred implementations, the used criterion based on the measure of distance between the region to be replaced and the region to be selected is applied not to all of the pixels within the region to be replaced and within the region to be selected. Moreover, the criterion is preferably applied to a reduced number of the pixels within the region to be replaced and within the region to be selected. Especially, the pixels of the reduced number are equally distributed within the region to be replaced and the region to be selected, preferably, in both of the two dimensions of the image. Preferably, the reduced number of pixels is the same on every layer of the resolution pyramid.

Preferably, at the finer layers of the resolution pyramid, the replacing is applied to a subset of the at least one region within the binary mask. Preferably, an equally or randomly distributed subset of all of the regions within the mask is replaced. The replaced subset is expanded to the remaining adjacent subsets in order to fill the regions within the mask completely. That preferred implementation results in significantly reduced effort.

In preferred implementations, the content within the binary mask is initially modified, preferably, by content outside the binary mask. That initial modification is done on the coarsest layer of the resolution pyramid before the selecting of regions outside the mask for replacing a region within the mask. The initial modification ensures that the content within the mask is influenced by content outside the mask. Hence, the regions outside the mask can be selected more easily. The initial modification is preferably done by filtering the surrounding content outside the binary mask, e.g., by an erosion filter.

Preferably, the inventive method is computer-implemented.

Features and steps that are described as being preferred may preferably be combined, too.

Implementations of the present invention further provide an image processing apparatus that allows the removal of a visual object from a visual data stream. The image processing apparatus includes a receiving unit that is adapted to receive a live visual data stream containing a present image and subsequent images. Each of the images contains pixels in two dimensions. The image processing apparatus further includes a processing unit adapted for the following steps. In one of the steps, a contour of a visual object selected in the present image is defined. In a further step, a binary mask is determined on the basis of the contour. A resolution pyramid of the present image is calculated. That resolution pyramid includes several layers from a coarsest layer to a finest layer. The following steps of selecting and replacing regions are performed at the coarsest layer of the calculated resolution pyramid first of all. Regions of the image outside the binary mask are selected in order to replace a region within the mask. For this, preferably, a criterion based on the measure of distance between the region to be replaced and the region to be selected is used. That region within the mask is replaced by content of the selected regions. The content is weighted by a measure of matching quality between the region to be replaced and the selected region.

After the selecting and the replacing of one or more regions within the binary mask are performed at the coarsest layer of the resolution pyramid, those steps of selecting and replacing are repeated at the next finer layer of the calculated resolution pyramid. That repeating is proceeded successively at each of the finer layers of the resolution pyramid until the finest layer is reached. The repeated replacing is also based on the content replaced at the next coarser layer. After that repeated replacing, the binary mask of the present image is filled completely so that the selected visual object is removed in that present image. A subsequent image of the live visual data stream is received by the receiving unit. The processing unit is further adapted to repeat that step of determining a binary mask and that step of calculating a resolution pyramid for the subsequent image. Furthermore, the processing unit is adapted to repeat the steps of repeated selecting and repeated replacing for the received subsequent image. However, that repeated replacing is also based on the content replaced in the corresponding region of the preceding image. As explained in regard to the initially present image, the steps of selecting and replacing are performed starting at the coarsest layer of the resolution pyramid and proceed successively at each of the finer layers of the resolution pyramid until the finest layer is reached. After that repeated replacing, the binary mask of the subsequent image is filled completely so that the selected visual object is removed in that subsequent image, too.

Preferably, the receiving unit of the image processing apparatus further includes a camera for generating the live visual data stream.

Preferably, the image processing apparatus according to the certain implementations of the invention further includes an output unit adapted to output a live visual data stream. That output live visual data stream includes the present image and the subsequent images that include the replaced content. From there, in that output live visual, the selected visual object is removed.

In preferred embodiments of the image processing apparatus according to implementations of the invention, the output unit further includes a display for displaying the output live visual data stream. That display may be an LCD.

In especially preferred embodiments of the image processing apparatus according to the invention, that apparatus includes the camera as well as the display. That embodiment of the image processing apparatus is preferably formed by a smartphone or by a tablet PC. Further, the processing unit of that embodiment is advantageously adapted for replacing the region within the mask also on the basis of the location and orientation of the display. Such an apparatus forms a so-called magic lens.

Preferably, the camera and the display of the embodiment are located at a joint optical axis.

The processing unit of the image processing apparatus according to certain implementations of the invention is preferably adapted to replace the region within the mask of each image of the visual data stream in real-time. For this, the processing unit has to be adapted to process the steps of determining a binary mask, of calculating a resolution pyramid, of repeated selecting and of repeated replacing in real-time.

The processing unit of the image processing apparatus according to certain implementations of the invention preferably includes a multi-core processor.

Features that are described as being preferred may preferably be combined, too.

Preferably, the processing unit of the image processing apparatus according to implementations of the invention is further adapted to perform steps of preferred embodiments of the inventive method.

DETAILED DESCRIPTION

Figure 1:
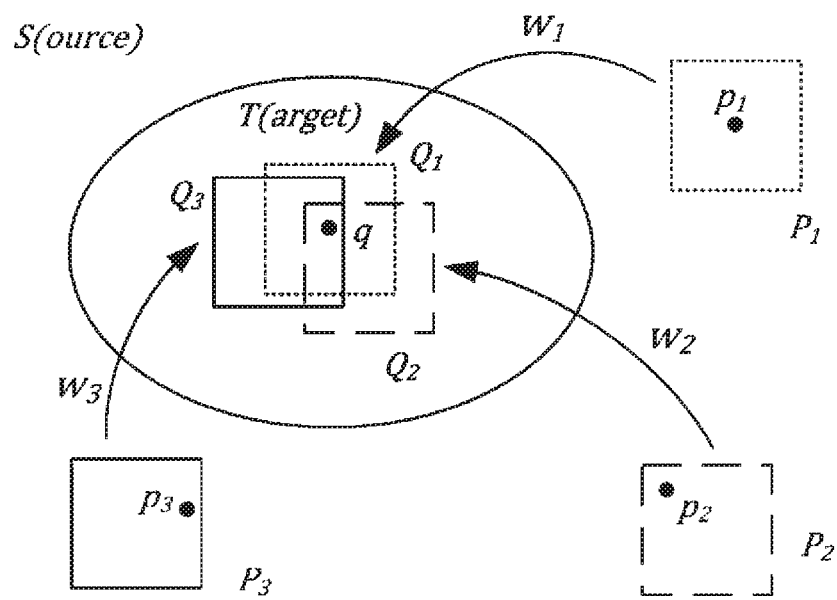
FIG. 1 shows a scheme of one update step for a pixel q ∈ T with three image patches according to certain preferred embodiments of the invention.

Implementations of the invention provide methods for removing a visual object without any restrictions to the environment and without any preprocessing steps. That method can be based on the usage of a single camera only. No distance or 3D environment structure information is necessary.

The method according to certain preferred embodiments of the invention can be separated into two different main tasks. A first main task is object selection and tracking. A second main task is image completion. While object selection tries to determine any arbitrary object roughly selected by the user, object tracking ensures that the once-selected object is followed and tracked during all consecutive image frames. The second main task then uses the information of the tracking result as a mask to remove the region of the visual object selected from the current image. The algorithm uses image patches from the remaining frame to fill the area to be removed while maximizing overall coherence to the original environment. The image completion results in replacement of regions of the selected visual object.

The result of the image completion algorithm directly depends on the accuracy of the tracking values. The more precisely the object is determined, the more remaining image patches can be used to fill the image area covered by it.

In order to diminish real world visual objects from the real environment in a live video stream, those have to be identified reliably. Further, the same visual objects have to be tracked in subsequent video frames in order to ensure a continuous and coherent removal.

An active contour algorithm for determining the region to be removed is preferably applied. That algorithm defines an energy minimizing problem to approximate a contour as close as possible to the visual object. This preferred approach has two advantages: on the one hand the algorithm is very fast and saves computational time for the following image completion and on the other hand the algorithm allows distinguishing between the visual objects to be removed and the desired background by a simple contour. The preferred steps of object selection and tracking can be separated into the following steps:

Rough object selection

Initial contour determination

Creation of completion mask

Contour expansion and (re-)determination

In the step of rough object selection, the user may define a rough contour of the object to be removed by simply enclosing the object, e.g., by the cursor or his finger depending on the device used. Especially on a tablet PC with touch display, this selection is very intuitive and allows for easy manipulation. In the step of initial contour determination, a few energy minimization iterations are sufficient to receive the initial object contour. If the entire contour energy converges to zero the contour selection fails and the determination starts again with the user defined rough contour (expanded by a small factor). The subsequently following image completion algorithm needs a binary mask to distinguish between desired and unwanted image pixels. In the step of the creation of the completion mask, a binary mask based on the current object contour is determined. Preferably, the shape is enlarged by a predefined pixel border to guarantee that the entire object will be removed in the later completion step. Additionally, small shadows of the object can be handled by this extra border allowing for more convincing results. In the step of contour expansion and (re-)determination, the contour is transferred to the next camera frame, i. e., to the subsequent image. The recent contour is preferably linearly expanded and used as a rough initial contour for the following image.

The algorithm tracks an arbitrary object structure from frame to frame without any predefined information and even allows the selection of concave object structures and provides sophisticated tracking results using 20 to 30 contour points.

The image completion algorithm according to certain implementations of the invention is based on image patches (regions) filling the determined image area with information from the remaining image. Although those patches may have an arbitrary size, preferably quadratic regions with an odd edge length are used to guarantee a single pixel right in the center.

The image region within the mask is replaced by image patches of the remaining frame data, i. e., by content of regions outside the mask. In order to determine the new color values of the pixels within the mask, a bidirectional dissimilarity function is preferably used. The bidirectional dissimilarity function gives a global measurement value on the visual dissimilarity of two images S(ource) and T(arget) with arbitrary dimensions. The function includes two terms measuring the visual completeness and the visual coherence between S and T. The image T is said to be visually complete with respect to S if all information of S appears in T. Furthermore, T is said to be visually coherent if T does not have any artifacts not existent in S. The completeness as well as the coherence terms are measured by a distance function defined for small images patches. According to certain implementations of the invention, a weight $w_i$ corresponding to the matching quality between the i-th patch in S and T is used. The error of a pixel $q \in T$ then defined by:

$$\mathrm{err}(T(q)) = \frac{1}{N_T} \sum_{i=1}^{n} w_i [S(p_i) - T(q)]^2$$

where n is the number of all patches $Q_i$ containing q, T(q) is the color of pixel q in T and $S(p_i)$ is the color of the corresponding pixel in each of the n associated patches $P_i$ in S. To minimize the error and by that maximize coherence, in each update step, the pixel color T(q) is calculated by:

$$T(q) = \frac{\sum_{i=1}^{n} w_i S(p_i)}{\sum_{i=1}^{n} w_i}$$

FIG. 1 shows the scheme of one update step for a pixel $q \in T$.

In this example, three image patches are selected. The color value of q is composed by the weighted color values p, of the corresponding patches $P_i \in T$; in this example: $P_1$, $P_2$, and $P_3$. However, rather than updating each target pixel individually by looking up of all patches $Q_i$ (and their corresponding patches $P_i$) containing the target pixel q, the algorithm updates all corresponding pixels covered by one patch concurrently since all pixels inside a patch are weighted using the same parameter. Thus, the approach takes each patch $Q_i$ from T and accumulates all containing pixel values with the weighted colors of the corresponding patch $P_i$. In the shown example, the color of q is defined by the weighted colors of $p_1$, $p_2$, and $p_3$. After all patches in T have been processed, the algorithm normalizes each target pixel's values by the accumulated patch as shown in FIG. 2.

Figure 2:
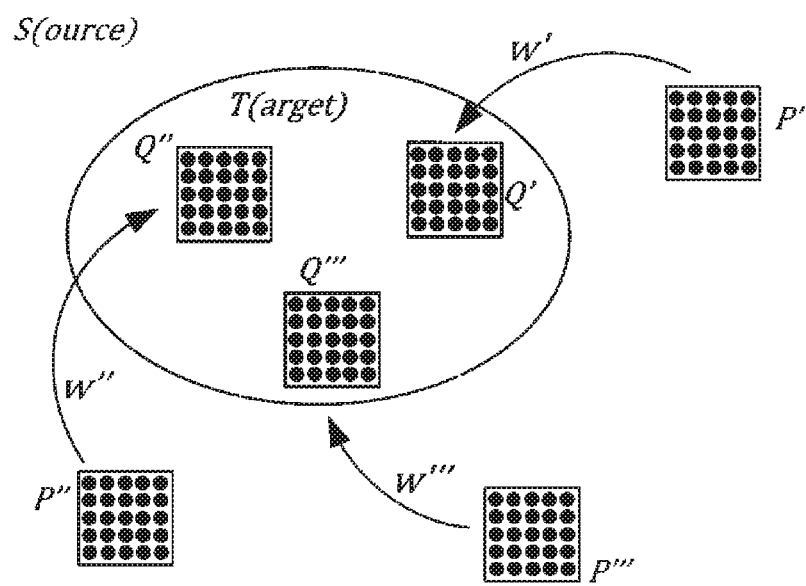
FIG. 2 shows an update iteration at which color values of the patch correspondence are weighted according to certain preferred embodiments of the invention.

FIG. 2 shows one of the update iterations. For each patch Q of T, all color values of the patch correspondence are weighted with the same weight and the results are accumulated. At the end, normalization on the pixel level is performed.

Finding the best correspondences for all patches of T in S with respect to the distance function is the most computationally-intensive task in the entire image completion pipeline. According to certain preferred embodiments of the invention, the finding of best correspondences is separated into three different steps:

Initialization

Propagation

Random search

The algorithm starts with an initial set of patch correspondences. This set can be defined, e.g., randomly or with respect to any prior information providing a good initial guess. Each patch match in T is checked for improvements by its direct two neighbors (in scan-line-order). This propagation step covers the fact that often neighboring patches in T will correspond to neighboring patches in S. Each patch propagation is followed by a few random search iterations trying to find a better patch in the source image.

According to certain implementations of the invention, several pyramid image levels are used to speed up the process. The image completion algorithm, i. e., the selecting and replacement of regions, starts on the coarsest layer and stops on the finest level. On each layer, several update iterations using are performed. After the algorithm has converged, the visual result and the patch correspondences are propagated to the next finer pyramid level to improve the image quality with more visual details.

Preferably, a 3×3 morphological erosion filter is used on the coarsest pyramid layer removing the masked image pixels. The area is filled with weighted pixel values of the border of the hole, i. e., with values of pixels surrounding the mask. Because the image dimension in this layer is very small, the filtering result is almost perfect and thus is a much better initial guess. Additionally, lesser update iterations are necessary on this level to achieve convergence. The image frames are preferably scaled using a bi-cubic interpolation to provide the best image quality as possible for start-up. Whereas the binary completion mask is scaled using a nearest pixel approach to save computational time and to receive a binary mask again.

According to preferred embodiments of the invention, SSD (sum of squared differences) is combined with the spatial patch distance in order to find patch correspondences with optimal visual and spatial neighboring characteristics. Thus, the algorithm chooses, e.g., the nearest patch from two spatial patch candidates with similar visual properties. As a result, the synthesized area does not have unintended boundaries, provides comparable image results, and allows for real-time performance.

As mentioned above, an explicit weighting term $w_i$ is preferably used to improve the resulting image quality and to speed up the convergence process. An exponential function of the negative $L^2$ norm in the patch space provides sufficient results in most environments:

$$w_i = e^{-\sqrt{\Sigma_{p \in P_i, q \in Q_i}[S(o)-T(q)]^2}}$$

where the weight $w_i$ is determined for the correspondence of patch $P_i \in S$ and $Q_i \in T$. Obviously, $w_i$ is 1 for identical patches and decreases exponentially with increasing patch SSD. Therefore, color values of an almost perfect matching patch will be weighted significantly higher than those of a patch moderately matching.

Certain implementations of the inventive method are advantageously computer-implemented. A preferred computer implementation provides efficient access to a live camera frame and allows for multi-core support. In the following, significant optimizations achieving a real-time capable system are described.

In order to process the huge amount of image data provided by a live video stream, the patch search and image completion algorithm works preferably on grayscale images only; except for the last iteration, i. e., at the finest layer of the resolution pyramid. Thus, in that embodiment, the patch match and completion algorithm uses only one third of the available image information, speeding up the entire process significantly. However, to achieve a full colored frame in the final image completion step, i. e., at the highest pyramid layer, the randomized patch match correspondences from the previous grayscale images are used to assign color pixel values. In most cases and environments, this data reduction does not produce different results compared to an image completion using, e.g., RGB, YUV, or L*a*b* color spaces for the entire pipeline.

As stated above, different patch sizes are preferably used for different pyramid levels. Preferably, the same number of SSD sample points is used for patch matching independent of the actual patch size. Those sample point are preferably equally distributed. Further, with increasing image size on finer pyramid levels, patch matching and the subsequent completion steps require a significantly higher computation time. Thus, certain preferred embodiments of the inventive method do not use each possible patch in the target region but uses an equally distributed subset of them.

Once the image completion algorithm successfully finishes the computation for the first frame, the approximated patch correspondences are used as an initialization for the next camera frame, i. e., for the subsequent image. The content of two consecutive camera frames typically will not differ significantly and thus the information of the previous frame can be used as an initialization for the subsequent frame. On the one hand, this frame to frame propagation saves computation time; on the other hand, this technique increases frame-to-frame image coherence and reduces patch flickering. Otherwise, there would be no guarantee that consecutive camera frames would end up with a similar image completion result.

Preferred embodiments of the inventive computer-implemented method are based on a single implementation for both, single and multi-core processors, and scales linearly with the number of CPU cores. Those embodiments of a multi-core capable implementation do not introduce any performance penalty on a single core system. Further, all expensive parallelizable functions provide a speedup factor comparable to the number of CPU cores; except for some negligible overhead. The randomized patch search algorithm represents the most time consuming task in the entire image completion pipeline. Therefore, the original serial propagation algorithm is evolved into a parallel propagation algorithm. On the one hand, the patch propagation speeds up the entire approximation; on the other hand, the propagation ensures that neighboring patches in the source region will converge to neighboring patches in the target region. Those embodiments of the search algorithm can operate on small image subsets which can directly be parallelized. To avoid propagation jumps at the subset boundaries a simple but effective modification is used.

For each first patch in the image subset the almost perfect patch match is determined by a significantly higher number of random search iterations. Therefore, each algorithm starts with a nearby optimal assigned patch and can propagate the information to several neighbors in the same data subset. The additional computational effort is negligible in comparison to the total number of patches inside such an image subset.

The invention claimed is:

1. A method for removing a visual object from a visual data stream, comprising:
   receiving a live visual data stream containing a present image and subsequent images, wherein each of the images contains pixels in two dimensions;
   selecting a visual object to be removed by defining a contour of the visual object in the present image;
   determining a binary mask based on the contour of that visual object;
   calculating a resolution pyramid of the present image, wherein the resolution pyramid comprises several layers from a coarsest layer to a finest layer;
   selecting regions outside the mask for replacing a region within the mask, wherein the selecting is started at the coarsest layer of the resolution pyramid;
   replacing the region within the mask by content of the selected regions, wherein the content is weighted by a measure of matching quality between the region to be replaced and the selected region, and wherein the selecting is started at the coarsest layer of the resolution pyramid;
   repeating the selecting and the replacing successively at each of the finer layers of the resolution pyramid and finishing at the finest layer, wherein the repeated replacing is also based on the content replaced at the next coarser layer;

receiving a subsequent image of the live visual data stream; and repeating the step of determining a binary mask, the step of calculating a resolution pyramid, and the steps of repeated selecting and repeated replacing, for a received subsequent image, wherein the repeated replacing is also based on content replaced in a preceding image.

2. The method of claim 1, wherein the determining of a binary mask in the subsequent image is also based on the binary mask of the preceding image.

3. The method of claim 1, wherein the regions to be selected are quadratic.

4. The method of claim 3, wherein the regions to be selected become wider from layer to layer of the resolution pyramid.

5. The method of claim 1, wherein the binary mask is enlarged by a predefined pixel border.

6. The method of claim 1, wherein the image content within the binary mask is replaced as the value of each pixel within the mask is calculated by values of pixels within the selected regions, the value of the corresponding pixel within the binary mask of the next coarser layer, and the value of the corresponding pixel within the binary mask of the preceding image.

7. The method of claim 1, wherein, at the finest layer of the resolution pyramid, the selecting and the replacing are based on a color value of each pixel in the region to be replaced and in the region to be selected, and wherein, at all other layers of the resolution pyramid, the selecting and the replacing are based on the gray value of each pixel in the region to be replaced and in the region to be selected.

8. The method of claim 1, wherein the repeated selecting of regions outside the mask is also based on the regions selected in the preceding image.

9. The method of claim 1, wherein the selecting of regions outside the mask for replacing a region within the mask is decided by using a criterion based on a measure of distance between the region to be replaced and the region to be selected.

10. The method of claim 9, wherein the used criterion based on the measure of distance between the region to be replaced and the region to be selected is applied to a reduced number of the pixels within the region to be replaced and within the regions to be selected.

11. The method of claim 10, wherein the pixels of the reduced number are equally distributed within the region to be replaced and the regions to be selected.

12. The method of claim 1, wherein, at the finer layers of the resolution pyramid, the replacing is applied to an equally distributed subset of the region within the mask.

13. The method of claim 1, wherein, on the coarsest layer of the resolution pyramid, before the selecting of regions outside the mask, the content within the binary mask is modified by content outside the binary mask.

14. The method of claim 13, wherein, on the coarsest layer of the resolution pyramid, before the selecting of regions outside the mask, the surrounding content outside the binary mask is weighted by an erosion filter in order to modify the content within the binary mask.

15. An image processing apparatus, comprising a receiving unit adapted to receive a live visual data stream containing a present image and subsequent images, wherein each of the images contains pixels in two dimensions; further comprising a processing unit adapted for:

defining a contour of a visual object selected in a present image;

determining a binary mask based on the contour of that object;

calculating a resolution pyramid of the present image, wherein the resolution pyramid includes several layers from a coarsest layer to a finest layer;

selecting regions outside the mask for replacing a region within the mask, wherein the selecting is started at the coarsest layer of the resolution pyramid;

replacing the region within the mask by content of the selected regions, wherein the content is weighted by a measure of matching quality between the region to be replaced and the selected region, and wherein the selecting is started at the coarsest layer of the resolution pyramid;

repeating the selecting and the replacing successively at each of the finer layers of the resolution pyramid finishing at the finest layer, wherein the repeated replacing is also based on the content replaced at the next coarser layer; and repeating the step of determining a binary mask, the step of calculating a resolution pyramid, and the steps of repeated selecting and repeated replacing for the received subsequent image, wherein that repeated replacing is also based on the content replaced in the preceding image.

16. The image processing apparatus of claim 15, wherein the receiving unit includes a camera for generating the live visual data stream.

17. The image processing apparatus of claim 16, further comprising an output unit adapted to output the present image and the subsequent images comprising the replaced content as a live visual data stream.

18. The image processing apparatus of claim 17, wherein the output unit further comprises a display for displaying the output live visual data stream.

19. The image processing apparatus of claim 18, wherein the processing unit is adapted for replacing the region within the mask also on the basis of the location and orientation of the display.

20. The image processing apparatus of claim 15, wherein the processing unit is adapted to replace the region within the mask of each image of the visual data stream in real-time.

21. The image processing apparatus of claim 20, wherein the processing unit comprises a multi-core processor.

* * * * *